United States Patent [19]
Wautier et al.

[11] Patent Number: 5,656,718
[45] Date of Patent: Aug. 12, 1997

[54] PROCESS FOR THE CONTINUOUS MANUFACTURE OF POLY-ε-CAPROLACTONES

[75] Inventors: Henri Wautier, Braine-le-Comte; Lucienne Detournay, Brussels; Martine Kaszacs, Braine-l'Alleud, all of Belgium

[73] Assignee: Solvay (Société Anonyme), Brussels, Belgium

[21] Appl. No.: 623,815

[22] Filed: Mar. 29, 1996

[30] Foreign Application Priority Data

Apr. 7, 1995 [BE] Belgium .................. 09500324

[51] Int. Cl.$^6$ .................................... C08G 63/08
[52] U.S. Cl. .................. 528/357; 528/354; 528/361; 524/765
[58] Field of Search ............... 528/354, 357, 528/361; 524/765

[56] References Cited

U.S. PATENT DOCUMENTS 5,468,837  11/1995  Wautier ................... 528/357

FOREIGN PATENT DOCUMENTS

1001149A6  8/1989  Belgium .

*Primary Examiner*—Samuel A. Acquah
*Attorney, Agent, or Firm*—Spencer & Frank

[57] ABSTRACT

Poly-ε-caprolactones are produced by continuous polymerization of ε-caprolactone as a melt in an extruder (reactive extrusion) with the use, as polymerization initiator, of aluminium trialkoxides in which at least one alkoxy radical includes at least one other oxygen atom besides the oxygen atom constituting the aluminoxane (Al—O) bond. This oxygen atom is advantageously present in the form of an ester or ether functional group. These initiators are generally in the liquid state at ambient temperature and are furthermore miscible with ε-caprolactone, with the result that they can be used in the absence of solvent. The appropriate adjustment of the feed flow rates of ε-caprolactone and of initiator to the extruder permits the manufacture of custom-made poly-ε-caprolactones which have predesigned weight-average molecular masses.

10 Claims, No Drawings

PROCESS FOR THE CONTINUOUS MANUFACTURE OF POLY-ε-CAPROLACTONES

The present invention relates to an improved process for the continuous manufacture of poly-ε-caprolactones. It relates more particularly to a process for the continuous polymerization of ε-caprolactone as a melt in an extruder (that is to say by reactive extrusion of ε-caprolactone).

Patent Application EP-A-0 626 405 in the name of Solvay discloses a process for the manufacture of poly-ε-caprolactones by continuous polymerization of ε-caprolactone as a melt in an extruder with the use of aluminium alkoxides preferably chosen from aluminium trialkoxides of general formula Al(OR)₃ in which R denotes a linear or branched alkyl radical containing from 2 to 6 carbon atoms, such as preferably aluminium triisopropoxide and aluminium tri-sec-butoxide. The aluminium trialkoxides described in the prior art permit the manufacture of custom-made poly-ε-caprolactones of variable molecular masses, including very high molecular masses which are approximately established beforehand by adapting the feed flow rates of ε-caprolactone and of initiator to the extruder. However, a considerable number of the preferred alkoxides of the prior art are in the solid or highly viscous liquid state at ambient temperature, with the result that they must be diluted to allow them to be used. This is the case especially with aluminium triisopropoxide and tri-sec-butoxide.

Dilution of the initiators in an organic solvent such as heptane, optionally followed by filtration, makes it possible to obtain a solution which is easy to use. Diluting the initiator is also necessary to obtain better accuracy in its metering with a view to the manufacture of poly-ε-caprolactones of predesigned molecular masses. However, this dilution has numerous disadvantages. Thus, it has now been found indispensable to subject the initiator dissolved in the solvent and the ε-caprolactone to intense premixing with vigorous stirring with a view to guaranteeing rapid and uniform dispersion of the initiator in the monomer, which is indispensable for homogeneous polymerization. Now, conventional extruder fittings cannot ensure such premixing solely using the screw profile. Neither a particularly blending screw profile nor blending components at the beginning of a screw enable this problem to be solved, and this therefore means that an independent mixer (for example a static mixer) must be used. Even in this case, difficulties are encountered because of the obstruction of conduits by premature polymerization, since the monomer and the initiator are already present therein in the proportions corresponding to the final polymer.

Dilution of the initiator with a solvent has other disadvantages for the continuous polymerization of ε-caprolactone in an extruder. It is essential, in fact, that the extruder is provided with a degassing vent to remove the solvent, which must, furthermore, be recycled or destroyed. In addition, the solvents employed are in most cases flammable and require additional fire-prevention precautions.

The objective of the present invention is to provide a process for the continuous polymerization of ε-caprolactone as a melt in an extruder, which no longer presents the abovementioned disadvantages.

To this end the invention relates to a process for the continuous manufacture of poly-ε-caprolactones by continuous polymerization of ε-caprolactone as a melt in an extruder with the use of aluminiumalkoxides as polymerization initiators, characterized in that the aluminium alkoxide is chosen from aluminium trialkoxides in which at least one alkoxy radical includes at least one other oxygen atom besides the oxygen atom forming the aluminoxane (Al—O—) bond.

For the purpose of the present invention an extruder is intended to denote any continuous device including a feed zone and a discharge zone, through which the molten substance is forced to pass with mean residence times not exceeding approximately 15 minutes. The extruders as defined must be capable of performing the following functions: mixing of the substances introduced, in this case monomer and polymerization initiator, 5 transporting the substances from the feed point to a die and removing the heat of reaction. Known extruders based on the work of two screws, regardless of whether they rotate in the same or opposite direction, will advantageously be used.

Polymerization as a melt is intended to denote polymerization in the substantial absence of solvent or of diluent at a temperature which is at least equal to the melting temperature of the poly-ε-caprolactones produced.

Poly-ε-caprolactones are intended to denote both ε-caprolactone homopolymers and copolymers with other lactones, such as β-propiolactone or δ-valerolactone, with a preponderant content of ε-caprolactone. The process according to the invention therefore applies both to the homopolymerization and to the copolymerization of ε-caprolactone with other lactones. Nevertheless, it is very particularly suited for the manufacture of poly-ε-caprolactone homopolymers.

The Applicant Company has found that aluminium trialkoxides in which at least one alkoxy radical contains at least one other oxygen atom besides the oxygen atom constituting an aluminoxane (Al—O) bond are generally in liquid state at ambient temperature and are furthermore miscible with ε-caprolactone (that is to say they form a single phase with ε-caprolactone when they are mixed therein in the proportions required for initiating the polymerization). The polymerization initiators for ε-caprolactone according to the present invention may consequently be dispersed in ε-caprolactone in the absence of solvent even in premixing conditions which are not very intense. They yield poly-ε-caprolactones of homogeneous appearance and free from polymer aggregates in unpolymerized monomer. In addition, the polymerization initiators according to the present invention exhibit all the advantages described in relation to the aluminium trialkoxides of the prior art, such as a very high activity, the absence of any significant effect of the polymerization temperature on the molecular masses of the poly-ε-caprolactones produced and the production of poly-ε-caprolactones that have a ratio of the weight-average molecular mass ($M_w$) to the number-average molecular mass ($M_n$) which is at least 2 and in most cases at least 2.2 (the said molecular masses being measured by gel permeation chromatography in tetrahydrofuran at 25° C.).

In principle, any aluminiumtrialkoxides in which at least one alkoxy radical includes at least one additional oxygen atom (over and above the oxygen atom of the aluminoxane bond (Al—O)) are suitable as polymerization initiators within the scope of the present invention. This additional oxygen atom is advantageously present in the form of an ester functional group or an ether functional group.

Examples of aluminium trialkoxides according to the invention in which at least one of the alkoxy radicals contains an additional oxygen atom present in the form of an ester functional group correspond to the statistical general formula (I) below:

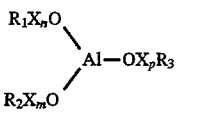 (I)

in which:

X denotes a radical derived from ε-caprolactone, of formula $$-(CH_2)_5-C-O-$$
$$\parallel$$
$$O$$

n, m and p denote, independently of each other, integers from 0 to 12, the sum of which is at least 1 and does not exceed 12, $R_1$, $R_2$ and $R_3$ denote, independently of each other, a linear or branched alkyl radical containing from 1 to 10 carbon atoms.

The sum of the numbers n, m and p is preferably from 3 to 10 and still more particularly from 6 to 9.

The radicals $R_1$, $R_2$ and $R_3$ are preferably identical and denote a linear or branched alkyl radical containing from 2 to 8 carbon atoms and still more particularly from 2 to 6 carbon atoms. Radicals of this type which are particularly preferred are the ethyl, propyl, isopropyl, butyl and sec-butyl radicals. By way of example of aluminium trialkoxide of this type which is very particularly preferred there may be mentioned, for example, the trialkoxide (I) in which the sum of n, m and p is 8 and $R_1$, $R_2$ and $R_3$ denote the sec-butyl radical.

Examples of aluminium trialkoxides according to the invention in which at least one of the alkoxy radicals contains an additional oxygen atom present in the form of an ether functional group correspond to the statistical general formula (II) below:

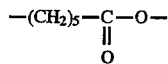 (II)

in which:

n denotes a number from 1 to 3, $R_4$ denotes a linear or branched alkyl radical containing from 1 to 10 carbon atoms, $R_5$ denotes a linear or branched alkylene radical containing from 1 to 10 carbon atoms, $R_6$ denotes an alkyl or aryl radical containing from 1 to 6 carbon atoms.

The alkyl radical $R_4$ and the alkylene radical $R_5$ preferably contain, independently of each other, from 2 to 8 carbon atoms and still more particularly from 2 to 6 carbon atoms. Furthermore $R_6$ preferably denotes an alkyl radical containing from 1 to 4 carbon atoms and still more particularly from 1 to 3 carbon atoms.

Trialkoxides of type (II) which are particularly preferred are furthermore those of statistical general formula (II) in which n denotes 3, that is to say aluminium trialkoxyalkoxides. By way of an example of a trialkoxide of this type which is very particularly preferred there may be mentioned, for example, tri(methoxyethoxy)aluminium.

The method of manufacture of the polymerization initiators of statistical general formula (I) and (II) is not critical. They may consequently be manufactured by any known process for the manufacture of aluminium alkoxides. Thus, for example, trialkoxides of type (I) containing an ester functional group may be advantageously manufactured by reacting ε-caprolactone with an aluminiumalkoxide of formula

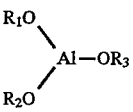 (I)

(called aluminium alcoholate hereinafter)

in which $R_1$, $R_2$ and $R_3$ have the meaning shown above, in a molar ratio of ε-caprolactone/Al present in the aluminium alcoholate which is equivalent to the sum of n, m and p in formula (I).

In this preparation ε-caprolactone also acts as a diluent for the aluminiumalcoholate and the synthesis of the initiator can therefore take place without any addition of hydrocarbon diluent.

The polymerization initiators of the type (II) can, for example, be prepared by:

reaction of a trialkylaluminium with 3 moles of alkoxyalcohol. Thus, to produce tri(methoxyethoxy) aluminium, one mole of trialkylaluminium, such as triethylaluminium, is reacted with 3 moles of methoxyethanol or else, and preferably, reaction of an aluminium trialkoxide with 1 to 3 moles of an alkoxyalcohol in conditions which result in a substitution of the alkoxy groups by alkoxyalkoxy groups. Tri (methoxyethoxy) aluminium can thus be produced by reacting one mole of aluminium tri-sec-butoxide with 3 moles of 2-methoxyethanol.

The polymerization initiators of type (I) and (II) have the advantage of being capable of being used without solvent and of dispersing rapidly and homogeneously in ε-caprolactone, even in the case of slow extrusion rates. The yields are excellent and the fact that a solvent is not used is reflected in a simplified technology which produces poly-ε-caprolactones requiring no further purification.

In general the initiators of type (II) are much less viscous than the initiators of type (I), which makes them much easier to handle using pumps and makes superfluous any preheating of the initiator before mixing and reacting with ε-caprolactone.

The aluminium trialkoxides in which at least one alkoxy radical contains an ether functional group (II) are consequently the initiators to which preference is very particularly given.

According to a particular and advantageous embodiment of the process of the present invention an aluminiumtrialkoxide is used as polymerization initiator in the presence of an alcohol. It has been found that the alcohols introduced over and above the trialkoxides in the reactive extrusion of ε-caprolactone act as chain transfer agents. The additional use of alcohols makes it possible to produce poly-ε-caprolactones of high molecular masses while using smaller quantities of aluminium trialkoxide and, consequently, to reduce the catalyst residues in the poly-ε-caprolactones produced.

The alcohols used over and above the trialkoxides according to the invention are advantageously linear or branched aliphatic alcohols containing from 1 to 10 carbon atoms and, preferably, from 2 to 6 carbon atoms. These alcohols may include ether functional groups and therefore include linear or branched aliphatic alkoxyalcohols containing from 1 to 10 carbon atoms and preferably from 2 to 6 carbon atoms. The alcohol is generally used in a quantity which does not exceed 10 moles per mole of aluminium trialkoxide. In most cases this quantity does not exceed 6 moles per mole of aluminium trialkoxide. The quantity of alcohol used preferably does not exceed 3 moles per mole of aluminium trialkoxide. Furthermore, the alcohols may be used separately or as a mixture with aluminium trialkoxide or else with ε-caprolactone. They are advantageously used mixed with aluminium trialkoxide.

The quantity of polymerization initiator to be used in the polymerization of ε-caprolactone may vary within fairly broad limits and depends essentially on the weight-average molecular masses ($M_W$) aimed at for the poly-ε-caprolactones. It has been found, in fact, that a practically linear relationship, which is independent of the polymerization temperature, exists between, on the one hand, the ratio of the feed flow rates of lactone and polymerization initiator to the extruder and, on the other hand, the weight-average molecular mass ($M_W$) of the poly-ε-caprolactone produced.

The process according to the invention consequently permits the continuous manufacture of poly-ε-caprolactones of approximate weight-average molecular masses ($M_W$) which are established beforehand by regulating the feed flow rates of lactone and of polymerization initiator to the extruder in accordance with the following equation:

$$M_w = \frac{2.25}{3+a} \times \frac{\text{feed flow rate of lactone (in g/min)}}{\text{feed flow rate of initiator (in moles of Al/min)}}$$

in which a denotes the number of moles of alcohol used per mole of aluminium.

In this equation a therefore denotes a number which generally does not exceed 10, in most cases 6 and preferably 3. It is to be understood that a is equal to zero when the polymerization is performed in the absence of alcohol.

The process according to the invention is very particularly suited for the manufacture of poly-ε-caprolactones of weight molecular masses which are so high that it is cumbersome to isolate them from the reactors at the end of a cycle in noncontinuous polymerization. This is why it is applied preferably to the manufacture of poly-ε-caprolactones which have weight-average molecular-masses of at least approximately 75 000 g/mol. All the reactants used in the polymerization process according to the invention must ideally be anhydrous. Nevertheless, residual water contents not exceeding 100 mg/kg of lactone and, still more particularly, not exceeding 50 mg/kg of lactone can be tolerated because they have no significant influence on the weight-average molecular mass of the poly-ε-caprolactones produced according to the process of the invention.

The absence of any significant effect of the polymerization temperature (that is to say the temperature of the material in the extruder) on the molecular masses of the poly-ε-caprolactones produced has, furthermore, the advantage that the temperature differences between the various zones of the extruder have no significant effect on the molecular masses of the poly-ε-caprolactones produced. In fact, the polymerization temperature affects essentially the polymerization rate. In the process according to the invention the temperature in the extruder may therefore fluctuate, without disadvantage, within a fairly broad measure, provided that it is at least equal to the melting temperature of the poly-ε-caprolactones produced. To give an idea, the minimum temperature in the case of the homopolymerization of 6-caprolactone will be situated at 60° C. Higher temperatures allow the polymerization rate to be speeded up. Nevertheless, in practice 200° C. and preferably approximately 185° C. will generally not be exceeded, so as to avoid any risk of degradation of the poly-ε-caprolactones produced.

The polymerization temperature will furthermore be chosen so as to obtain conversion ratios and yields which are close to 100% in the case of mean residence times of the reaction mass in the extruder not exceeding approximately 15 minutes. These mean residence times depend, of course, on the configuration of the extruder and, where appropriate, on the speed of rotation of the screws.

Excellent results have been obtained by continuous polymerization of ε-caprolactone as a melt at a temperature of approximately between 110° and 170° C. with mean residence times in the extruder generally not exceeding approximately 10 minutes and, still more particularly, not exceeding 5 minutes. In all cases conversion ratios and yields well above 95% were obtained. At the exit of the extruder the extruded laces of poly-ε-caprolactones will be cooled before being granulated in accordance with techniques which are well known to a person skilled in the art.

The examples which follow are intended to illustrate the invention.

In Example 1 a polymerization initiator was used of the aluminium trialkoxide the containing an ester functional group, of statistical general formula (I) in which the sum of n, m and p is 8 and $R_1$, $R_2$ and $R_3$ denote, all three, a sec-butyl radical.

This initiator, which was prepared by adding ε-caprolactone to aluminium tri-sec-butoxide in a molar ratio of 8:1 at 25° C. contains 0.86 mol of aluminium per kg.

In Example 2 a polymerization initiator was used of the aluminium trialkoxide type containing an ether functional group, of statistical general formula (II) in which n is 3, $R_5$ denotes an ethylene radical and $R_6$ denotes a methyl radical, as a mixture with sec-butanol in the trialkoxide:alcohol molar ratio of 1:3. This initiator, which was prepared by reaction of methoxyethanol with aluminium tri-sec-butoxide in a molar ratio of 3:1 at 25° C., without separating the sec-butanol produced, contains 2.1 moles of aluminium per kg.

Example 1 was carried out in an extruder with two screws rotating in the same direction (of ZR 80 type). Example 2 was carried out in an extruder with two screws rotating in opposite direction (of Cincinnati Milacron type). Besides the two conveying screws, these extruders are provided essentially with a gear pump situated at the end of the extruder and intended to expel the molten polymer through a die, a Jacket for circulating a heat-transfer fluid, and a temperature sensor situated before the pump.

EXAMPLE 1

The extruder with twin screws rotating in the same direction is fed at ambient temperature with ε-caprolactone at a constant flow rate set at 11 kg/h. The initiator, preheated to 80° C, is introduced at approximately 100 mm from the beginning of the screw at a flow rate of 65 g/h or 0.056 mol of aluminium/h, with the result that the theoretical weight-average molecular mass, calculated according to the equation given in detail above, is approximately 147 000 g/mol.

The extruder is cooled by oil circulation in the jacket, maintained at an entry temperature of 130° C., and the speed of rotation of the screws is kept constant and equal to 15 rev/min.

The temperature of the poly-ε-caprolactone measured at the screw exit (polymerization temperature) is 160° C. The mean residence time of the substances in the extruder is estimated at approximately 2 minutes.

The poly-ε-caprolactone has a homogeneous appearance at the die exit. It is cooled and granulated. The weight-average ($M_w$) and number-average ($M_n$) molecular masses are evaluated by gel permeation chromatography (GPC) in tetrahydrofuran at 25° C.

| | |
|---|---|
| $M_w$ (measured) | 144 000 g/mol |
| $M_w$ (calculated) | 147 000 g/mol |
| $M_w/M_n$ | 2.3 |

EXAMPLE 2

The extruder with twin screws rotating in opposite direction is fed at ambient temperature with ε-caprolactone at a constant flow rate set at 72.6 kg/h and, furthermore, with polymerization initiator at a constant flow rate set at 152 g/h or 0.32 mol of aluminium/h with a view to producing poly-ε-caprolactone exhibiting a theoretical weight-average molecular mass $M_W$ calculated according to the equation given in detail above of approximately 85 000 g/mol (it should be emphasized that, in this case, a is 3).

The extruder is cooled by oil circulation in the jacket which is maintained at an entry temperature of 150° C., and the speed of rotation of the screws is kept constant and equal to 25 rev/min.

The temperature of the poly-ε-caprolactone measured at the screw exit (polymerization temperature) is 160° C. The mean residence time of the materials in the extruder is estimated at approximately 70 s.

On leaving the die the poly-ε-caprolactone is cooled and granulated. The weight-average ($M_W$) and number-average ($M_n$) molecular masses are evaluated by gel permeation chromatography (GPC) in tetrahydrofuran at 25° C.

| | |
|---|---|
| $M_w$ (measured) | 82 000 g/mol |
| $M_w$ (calculated) | 85 000 g/mol |
| $M_w/M_n$ | 2.4 |

We claim:

1. Process for the continuous manufacture of poly-ε-caprolactones by continuous polymerization of ε-caprolactone as a melt in an extruder with the use of aluminiumalkoxides as polymerization initiators, characterized in that the aluminium alkoxide is chosen from aluminium trialkoxides in which at least one alkoxy radical includes at least one other oxygen atom besides the oxygen atom constituting the aluminoxane (Al—O) bond.

2. Process for the continuous manufacture of poly-ε-caprolactones in accordance with claim 1, characterized in that the other oxygen atom is present in the form of an ester or ether functional group.

3. Process for the continuous manufacture of poly-ε-caprolactones in accordance with claim 2, characterized in that the aluminium trialkoxides including an ester functional group correspond to the statistical general formula:

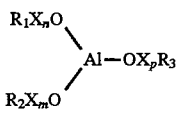  (I)

in which:

X denotes a radical derived from ε-caprolactone, of formula

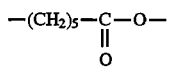

n, m and p denote, independently of each other, integers from 0 to 12, the sum of which is at least 1 and does not exceed 12, $R_1$, $R_2$ and $R_3$ denote, independently of each other, a linear or branched alkyl radical containing from 1 to 10 carbon atoms.

4. Process for the continuous manufacture of poly-ε-caprolactones in accordance with claim 3, characterized in that the sum of n, m and p is from 3 to 10 and in that $R_1$, $R_2$ and $R_3$ are identical and denote a linear or branched alkyl radical containing from 2 to 8 carbon atoms.

5. Process for the continuous manufacture of poly-ε-caprolactones in accordance with claim 2, characterized in that the aluminium trialkoxides including an ether functional group correspond to the statistical general formula:

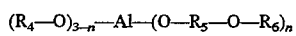

in which:

n denotes a number from 1 to 3, $R_4$ denotes a linear or branched alkyl radical containing from 1 to 10 carbon atoms, $R_5$ denotes a linear or branched alkylene radical containing from 1 to 10 carbon atoms, $R_6$ denotes an alkyl or aryl radical containing from 1 to 6 carbon atoms.

6. Process for the continuous manufacture of poly-ε-caprolactones in accordance with claim 5, characterized in that the alkyl radical $R_4$ and the alkylene radical $R_5$ contain, independently of each other, from 2 to 8 carbon atoms and in that $R_6$ denotes an alkyl radical containing from 1 to 4 carbon atoms.

7. Process for the continuous manufacture of poly-ε-caprolactones in accordance with claim 5, characterized in that n denotes 3.

8. Process for the continuous manufacture of poly-ε-caprolactones in accordance with claim 1, characterized in that an aluminium trialkoxide is used as polymerization initiator in the presence of a linear or branched aliphatic alcohol containing from 1 to 10 carbon atoms, in a quantity which does not exceed 10 moles per mole of aluminium trialkoxide.

9. Process for the continuous manufacture of poly-ε-caprolactones which have an approximate weight-average molecular mass $M_W$ established beforehand, by continuous polymerization of ε-caprolactone as a melt in an extruder according to claim 1, characterized in that the feed flow rates of lactone and of polymerization initiator to the extruder are regulated in accordance with the following equation:

$$M_w = \frac{2.25}{3+a} \times \frac{\text{feed flow rate of lactone (in g/min)}}{\text{feed flow rate of initiator (in moles of Al/min)}}$$

in which a denotes the number of moles of alcohol used per mole of aluminium.

10. Process for the manufacture of poly-ε-caprolactones in accordance with claim 1, characterized in that it is applied to the homopolymerization of ε-caprolactone.

* * * * *